(12) United States Patent
Patyn

(10) Patent No.: US 10,463,058 B2
(45) Date of Patent: Nov. 5, 2019

(54) METHOD FOR PRINTING ON MULTI-LAYERED, HOLLOW, CHOCOLATE FIGURES

(71) Applicant: C&B Logistics BVBA, Lokeran (BE)

(72) Inventor: Luk Patyn, Lokeren (BE)

(73) Assignee: C&B Logistics BVBA, Lokeren (BE)

( * ) Notice: Subject to any disclaimer, the term of this patent is extended or adjusted under 35 U.S.C. 154(b) by 0 days.

(21) Appl. No.: 15/536,162

(22) PCT Filed: Dec. 21, 2015

(86) PCT No.: PCT/IB2015/059827
§ 371 (c)(1),
(2) Date: Jun. 15, 2017

(87) PCT Pub. No.: WO2016/103149
PCT Pub. Date: Jun. 30, 2016

(65) Prior Publication Data
US 2017/0325475 A1 Nov. 16, 2017

(30) Foreign Application Priority Data
Dec. 22, 2014 (BE) .................... 2014/5144

(51) Int. Cl.
*A23G 1/54* (2006.01)
*A23G 3/34* (2006.01)
(Continued)

(52) U.S. Cl.
CPC .......... *A23G 1/545* (2013.01); *A23G 3/0097* (2013.01); *A23G 3/343* (2013.01); *A23P 20/20* (2016.08);
(Continued)

(58) Field of Classification Search
CPC ...... A23G 1/00; A23G 1/0003; A23G 1/0006; A23G 1/005; A23G 1/0053; A23G 1/0063;
(Continued)

(56) References Cited

U.S. PATENT DOCUMENTS 1,334,822 A * 3/1920 Varble ..................... B41F 17/34
101/35
1,780,091 A * 10/1930 Meinhofer ............... A23G 1/21
249/133
(Continued)

FOREIGN PATENT DOCUMENTS

BE     1003568 A5    4/1992
BE     1018215 A3    7/2010
(Continued)

OTHER PUBLICATIONS

JP08000176A Translation, published Jan. 9, 1996 (Year: 1996).*
(Continued)

*Primary Examiner* — Drew E Becker
*Assistant Examiner* — Bryan Kim
(74) *Attorney, Agent, or Firm* — James Creighton Wray

(57) ABSTRACT

The present invention relates to a method for providing a multi-layered, hollow, chocolate figure with a print in edible color preparation, comprising providing one half of a hollow, chocolate figure with one or more types of edible color preparation by means of an elastic pad, characterized in that the printing takes place at a pressure of between 8 and 12 bar and wherein the figure is situated in a mold-half during printing.

7 Claims, 2 Drawing Sheets

(51) Int. Cl.
*A23P 20/20* (2016.01)
*B29C 37/00* (2006.01)
*B41F 17/34* (2006.01)
*B41F 17/00* (2006.01)
*B41F 17/30* (2006.01)
*A23P 20/25* (2016.01)

(52) U.S. Cl.
CPC ..... *A23P 2020/253* (2016.08); *A23V 2002/00* (2013.01); *B29C 37/0025* (2013.01); *B29C 2037/0035* (2013.01); *B29C 2037/0046* (2013.01); *B41F 17/001* (2013.01); *B41F 17/002* (2013.01); *B41F 17/006* (2013.01); *B41F 17/30* (2013.01); *B41F 17/34* (2013.01)

(58) Field of Classification Search
CPC ...... A23G 1/0076; A23G 1/0096; A23G 1/21; A23G 1/205; A23G 1/30; A23G 1/305; A23G 3/0097; A23P 20/20; A23P 2020/253; B41F 17/001; B41F 17/002; B41F 17/006; B41F 17/30; B41F 17/34; B41K 3/02; B41K 3/04; B41K 3/24; B41K 3/26; B41K 3/56; B29C 37/0025; B29C 2037/0046; B29C 65/70; B29C 2795/00; B29C 2795/007
See application file for complete search history.

(56) References Cited

U.S. PATENT DOCUMENTS

| | | | | | |
|---|---|---|---|---|---|
| 1,931,409 | A | * | 10/1933 | Humphrey | A23G 3/20 426/104 |
| 3,094,920 | A | * | 6/1963 | Priesmeyer | A01K 43/10 101/41 |
| 3,961,089 | A | * | 6/1976 | Dogliotti | A23G 1/21 426/274 |
| 4,511,425 | A | * | 4/1985 | Boyd | B65C 9/188 100/211 |
| 4,578,273 | A | * | 3/1986 | Krubert | A21C 15/002 426/103 |
| 5,142,976 | A | * | 9/1992 | Roulleau | A01K 43/10 101/163 |
| 5,162,119 | A | * | 11/1992 | Pappas | A21C 9/04 101/106 |
| 8,365,659 | B2 | * | 2/2013 | Isler | A01K 43/10 101/125 |
| 2003/0035870 | A1 | * | 2/2003 | Ackley, Jr. | A23G 3/28 426/383 |
| 2003/0221567 | A1 | * | 12/2003 | Catalan | B41F 17/001 101/35 |
| 2007/0048407 | A1 | * | 3/2007 | Collins | A23G 3/0063 426/87 |
| 2008/0236414 | A1 | * | 10/2008 | De Volder | B41F 17/001 101/41 |
| 2012/0321750 | A1 | * | 12/2012 | Klene | A23G 3/42 426/93 |
| 2013/0216670 | A1 | * | 8/2013 | Willcocks | H04N 1/00188 426/383 |
| 2014/0193543 | A1 | | 7/2014 | Vigneri | |
| 2014/0193546 | A1 | * | 7/2014 | Vigneri | A23G 1/0076 426/93 |
| 2014/0234500 | A1 | * | 8/2014 | Mitchell | H04N 1/00188 426/302 |
| 2015/0202861 | A1 | * | 7/2015 | Baggen | B41F 15/34 101/127 |

FOREIGN PATENT DOCUMENTS

| | | |
|---|---|---|
| EP | 0462093 A1 | 12/1991 |
| EP | 0734655 A1 | 10/1996 |
| EP | 2084970 A1 | 8/2009 |
| EP | 2361506 A1 | 8/2011 |
| EP | 1020266 A3 | 7/2013 |
| JP | H08176 A | 1/1996 |
| RU | 2185071 C2 | 7/2002 |
| WO | 0150877 A2 | 7/2001 |
| WO | 0194116 A2 | 12/2001 |

OTHER PUBLICATIONS

Ingrid NPL, published Apr. 18, 2011, http://ingridcreates.com/how-to-paint-candy-coated-chocolate-easter-eggs/ (Year: 2011).*

* cited by examiner

METHOD FOR PRINTING ON MULTI-LAYERED, HOLLOW, CHOCOLATE FIGURES

This application claims the benefit of Belgian Application No. BE2014/5144 filed Dec. 22, 2014, and PCT/IB2015/059827 filed Dec. 21, 2015, International Publication No. WO 2016/103149, which are hereby incorporated by reference in their entirety as if fully set forth herein.

This invention relates to a method for manufacturing hollow, chocolate figures printed on with an edible colour preparation. By printing on hollow, chocolate figures, the usually uniform chocolate colour can be provided with clear colours which will make the products more attractive to look at. By playing with the degree of printing the products may, moreover, be provided with a certain feeling or sentiment. Moreover, features can be applied with great accuracy, which cannot be effected using chocolate. Such an effect cannot be achieved when, for instance, use is made of a hollow, chocolate figure consisting of several layers of chocolate that may or may not differ visually.

Such a method is known from BE1003568 wherein an edible colour preparation is applied by means of pad printing on a spherical and even surface such as a chocolate Easter egg.

A drawback of the method as known from the state of the art, is the fact that during printing the hollow figures often get damaged when printed on by means of the pad. Said hollow figures are often only a few mm thick and fragile. Due to their curved and often uneven surface the pad, moreover, has to be applied on the figures using a certain pressure, so that all regions to be printed on are evenly provided with the preparation. Too high a pressure will increase the risk of damage, too low a pressure will result in in a substandard print.

In addition, the edible colour preparation, known from the state of the art, is not optimised for printing on spherical surfaces that have often been provided with a relief (viz. a raised texture). In order to achieve a correct print, the composition of the colour preparation needs to be optimised.

This results in a need for an optimised method for printing on hollow, chocolate figures. Although methods have been described for providing hollow, chocolate figures with printing by means of pad printing, to date they have never been converted into actual practice. This is due to the fact that the methods known to date result in practical problems that Impede producing a high-quality print. The present invention provides a new, improved method for printing on hollow, chocolate figures. There is also a need for hollow figures provided with a uniform and high-quality print, wherein preferably facial expressions are shown by means of printing.

SUMMARY

According to a first aspect, the present invention provides a method for providing a multi-layered, hollow, chocolate figure with printing in an edible colour preparation. The method permits obtaining a qualitatively, uniform printing without damage being caused to the figures, for that purpose, the employed pressure, the pad used and the nature of the colour preparation used were adapted to make them suitable for printing on hollow, chocolate figures.

According to a second aspect, the present invention relates to a multi-layered, hollow, chocolate figure, due to printing, an attractive chocolate product is obtained, wherein expression is created and specific features can be emphasized. The figures come to life, as it were.

FIGURES

DESCRIPTION OF THE INVENTION

Figure 1:
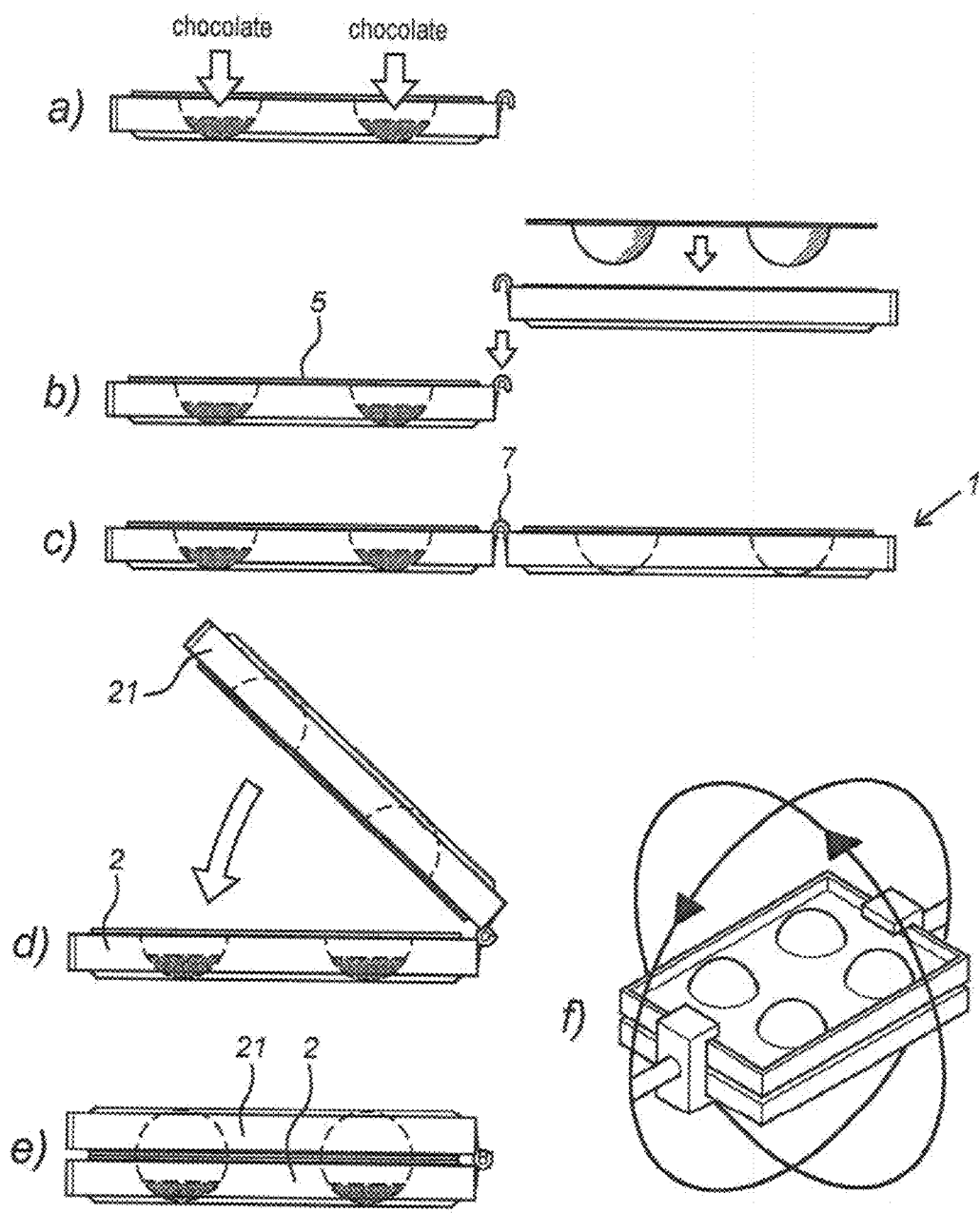
FIG. 1 shows a mould known from the state of the art, for the production of hollow, chocolate figures.

According to a first aspect, the present invention provides a method for printing on a multi-layered, hollow, chocolate figure by means of pad printing.

The method provides an optimised way of providing multi-layered, hollow, chocolate figures with a print in an edible colour preparation by means of pad printing. The method provides for an optimal and high-quality print wherein the risk of damage to the hollow figures is minimised.

Preferably, the method is automated.

In the present invention, the term 'automated' means a partially or fully industrialised method or process, in which human input has been reduced to a minimum and is largely taken over by computers, machines, robots or other systems.

In the present invention the term 'chocolate' refers to all chocolate or chocolate-like compounds having a fat phase that can be tempered and comprising at least one cocoa or cocoa-like component in said fat phase.

The term 'multi-layered' means a chocolate figure comprising several types of chocolate, or provided with chocolate types having at least two different colours. According to another embodiment, the term 'multi-layered' should be understood to mean a combination of a chocolate type and confectionery.

'Colour preparation' means a compound that is suitable for providing an (edible) print on a surface by means of pad printing. Preferably, said preparation will be in a liquid or semi-liquid state.

For that purpose, a pattern of an edible colour preparation is applied to a pre-shaped, multi-layered, hollow figure by means of a pad, the hollow figure preferably being provided in a holder.

The pattern that the figure is being provided with will, prior to printing, be applied to a cliché. According to the present invention, the term 'cliché' is understood to mean a flat plate, on which a predetermined pattern in relief has been made, for instance through etching or lasers, wherein the pattern is a negative of the ultimately desired print on the hollow figure. Preferably, the colour preparation will be provided to the cliché in a simple manner, for instance by means of a squeegee. Preferably, a cliché used in the present invention will have a thickness of between 0.25 and 1 mm, more preferably between 0.4 and 0.7 mm, such as approximately 0.6 mm.

The term 'pad' should preferably be understood to mean an elastic stamp, designed in a material allowing the absorption of the colour preparation, without it penetrating the material thus enabling discharge. Preferably, the pad will be made of a silicone material. Silicone is known for its ink-repellent properties.

The cliché will be provided with one or more colour preparation types. Different colour preparation types can be understood to mean a difference in composition and properties, as well as a difference in colour. In another preferred embodiment, each preparation type will be provided with an individual cliché, wherein one or more pads will take care of the printing.

In a next step, an elastic pad will be applied over the cliché provided with the preparation in order to absorb the colour preparation, after which the pad will move to the ready hollow figure in order to apply the print on one half of the figure. After the pad has removed itself again from the figures, the colour preparation will have been left on the figure-half in the desired pattern.

According to the present invention, one half of a figure should be understood to mean the half corresponding with a mould-half of a mould with which the figure is being produced.

In particular, during printing, the figure will be situated in a mould-half of the mould in which it was produced. For that purpose, the figures will be partially demoulded, wherein one mould-half is removed prior to printing. The inventors of the present invention found that leaving the figures in a mould-half during printing not only saves time during the printing process, but also permits employing a highly specific pressure during printing, resulting in a high-quality, uniform print, without damaging or breaking the hollow figures. The mould-half, as It were, serves as a shock-absorbing holder during printing. In particular, use will be made of a pressure of between 8 and 12 bar during printing. More specifically a pressure of between 9 and 11 bar, for instance 10 bar. Using said specific pressure range, in combination with the hollow figures that are situated in the Mould-half, yields a good-quality print.

During printing, use is preferably made of an elastic pad, such as a silicone pad. Due to its elastic nature, the pad will take on the shape of the chocolate surface to be printed on. Said surface, preferably, is substantially curved, and may or may not be provided with relief.

Preferably, the pad will have a hardness of between 8 and 12 Shore-A, more preferably of between 9 and 11 Shore-A, such as 10 Shore-A. Said hardness range turned out to be ideal for printing on the surface of the hollow chocolate figures.

Beyond said range either a high-quality print could not be achieved or the chocolate broke.

As indicated, the printing can be applied in one single go, wherein in consecutive steps or not, several preparations are applied to the figure-half. In another embodiment, the printing will be applied in several goes, wherein, for instance, for each colour, a cliché and individual pad will be used, wherein the figure-half will be sequentially printed on and in different areas.

When printing, the pad will preferably have a speed of between 100 and 200 mm/sec, preferably between 120 and 175 mm/sec, more preferably between 140 and 160 mm/sec, such as 150 mm/sec. Said speed will guarantee that the risk of volatility of the colour preparation or penetration into the pad is minimised. Too high a speed results in an inferior printing pattern or one that is not ideal.

The overall speed of the cliché to the figure surface will preferably be between 2 and 10 seconds, more preferably between 4 and 9 seconds.

For printing on hollow, chocolate figures, according to the present invention, it was also found that the viscosity of the colour preparation should comply with optimal requirements. On the one hand, the colour preparation should have a sufficiently low viscosity for the preparation plate or cliché to be filled nicely, without the formation of capillaries or air bubbles. In addition, the colour preparation should also have a sufficiently high viscosity to provide for proper cover, and to prevent the colour preparation from running on an uneven surface. The colour preparation should dry rather quickly.

The inventors of the present invention have, for that purpose, found that an optimal preparation has a dynamic viscosity of between 350 and 550 cP, more preferably between 400 and 500 cP, even more preferably between 420 and 480 cP, such as for instance 465 cP (measured using a Brookfield viscosity meter at 20° C.).

The preparation used will preferably comprise an alcohol-based solvent, one or more colour pigments and optionally an emulsifier, in a further embodiment, the colour preparation may also comprise a glazing agent. More specifically, the solvent will contain a mixture of at least two alcohols. The inventors of the present invention round that the use of a mixture of two alcohols makes for the suitable viscosity range.

By adding one or more pigments, the colour preparation obtains the desired colour. Examples of possible pigments are calcium carbonate, titanium dioxide (E171), iron oxides and Iron hydroxides, aluminium, silver, gold or a mixture thereof. The pigment has been suspended in the colour preparation.

The colour preparation may also comprise an emulsifier in order to obtain a proper and stable emulsion. An example of a suitable emulsifier is lecithin or lecithin based compounds.

Optionally, the colour preparation may contain further components such as a surfactant. The surfactant makes the preparation flow properly and thus prevents the deposited preparation layer from cracking. Optionally, the emulsifier and the surfactant in the colour preparation are of the same substance, for instance a polysorbate.

The colour preparation may furthermore be provided with a binding agent, such as sucrose or glucose. The presence of said sugars enhances the adhesion of the colour preparation to the chocolate. The sugars also: make the colour preparation taste sweet. For that purpose, the colour preparation may also be provided with sugar substitutes, such as stevia, aspartame, zusto or a combination thereof.

In a preferred embodiment, the colour preparation, according to the present invention, will at least contain the following components (In percentage by volume);
  35-45% of glazing agent
  25-35% of alcohol 1
  10-20% of alcohol 2
  15-25% of pigment
  <1% of emulsifier In particular, the preparation used will be applied to the chocolate surface in an average thickness of between 50 and 200 micron.

The drying time of the printed layer will preferably be between 0.25 and 2 seconds.

As described, the printing will take place when the chocolate figures are still in the mould-half used for manufacturing the hollow figures, in particular, use will be made of a mould, provided with two mould-halves that can be detached from each other, for instance by means of a hinge system as described in BE1020266. Such a mould may contain a framework, wherein each framework has been provided with mould leaves comprising one or more recesses in accordance with the figure-half of the intended hollow figure. In particular, one mould-half will be suitable for manufacturing the front of the hollow figure, whereas the second mould-half will produce the rear of the hollow figure. Preferably, the mould will be suitable for manufacturing multiple hollow figures.

In one possible embodiment, one mould-half will be provided with liquid chocolate and/or a confectionery material at the recesses in the mould-half. Preferably, first, specific areas will be coloured with a (chocolate) material that differs from the foundation layer of the hollow figures. Foundation layer refers to the layer that will be the predominant layer of the hollow figures obtained. Preferably, the foundation layer of the hollow figures will be obtained by means of rotational moulding (also called swirling), indicating a method wherein a device containing a closed mould that is partially filled with chocolate, wherein the device is tilted in various directions in a swirling machine as a result of which the molten chocolate present in the mould-half is swirled against the wall where it cools down. The device is swirled in the known manner for a suitable time span, wherein the mould is subsequently cooled down at room temperature under ventilated air, and wherein, after opening the mould, at least one hollow figure formed can be removed from the mould, consisting of two halves defining the front and rear of the object. In particular, the front and rear can be visually distinguished from each other by a seam formed between the two halves due to closing off the two mould-halves.

The filling degree of the figure-half can easily be set by an expert, depending on the desired final wall thickness of the object to be manufactured, and taking the properties of the material to be poured into account.

In particular, the figure manufactured should have an average wall thickness of between 2 and 5 mm. Such an average wall thickness is required in order to prevent the figure from breaking during printing.

Usually a filling degree of approximately 5-50% by volume relative to the volume of the figure-half will give good results. Preferably, a filling degree of 15-35% by volume is used.

Chocolate material comprises a large number of ingredients. The main ingredients, for instance, cocoa powder, cocoa butter, lecithin as emulsifier, vanillin, sugars and milk powders. The chocolate's exact composition should comply with the regulations on chocolate composition. In order to provide the chocolate with colours that differ from the characteristic colours of chocolate, such as red, green, orange, . . . colorants, both natural and synthetic, may be added to the chocolate.

In a preferred embodiment, the figure-half will (partially) be filled with different layers of chocolate or confectionery material, in order to thus obtain a final, multi-layered, hollow, chocolate figure consisting of different sub-layers positioned on a foundation layer of chocolate. Said sub-layers may, among others, consist of different materials, different from chocolate or of chocolate mixtures that have another colour than the foundation layer. More specifically, said sub-layers may preferably be applied in specific parts or sections of the figure-half, that guarantee the design and aesthetics of the hollow mould. In the example wherein the obtained hollow object depicts a person or an animal, it may, for instance, be the eyes, nose or snout of the object. Thus a relatively complex, multi-layered, hollow figure with a highly detailed finish can be obtained.

After decorating and swirling, a basic hollow figure is obtained that can be further decorated by means of a pad print according to the present invention.

For that purpose, the hollow figures obtained, will be partially demoulded. Partially demoulded means that the closed mould is opened and the hollow figures remain in one half. In a preferred embodiment, the other empty mould-half is uncoupled from the mould-half containing the figures. Uncoupling preferably takes place by detaching the snap connection of a detachable hinge that keeps both mould-halves together, wherein the hinge is divided into two parts, as it were, wherein each mould-half will have a part of the hinge. The mould-halves can also be connected again through a simple snap motion by which the hinge becomes functional again.

This may be important in situations in which, for instance, both halves of the figures need to be provided with a print. First of all, a first half will be demoulded (wherein the mould-halves will be opened or a mould-half is removed) after which the mould will be closed again, inverted, after which a second partial demoulding will take place, so that the as yet unprinted side will be exposed and can be printed on.

According to a second aspect, the present invention relates to a multi-layered, hollow, chocolate figure, comprising two halves, wherein at least one half of the figure has been provided with a print in one or more types of edible colour preparations, applied by means of pad printing. In particular, the figure will have an average wall thickness of between 2 and 5 mm. Hollow figures with a thinner wall would break during printing, whereas hollow figures that are too thick are unpleasant to consume.

Preferably, the printing will have an average thickness of between 50 and 200 micron.

In one embodiment, only one half of the figure will be provided with a print. In another embodiment, both halves will be provided with a print. The print may consist of one or more colours, wherein said colours depend on the composition of the colour preparation. Preferably a preparation is used, comprising an alcohol-based solvent, one or more colour pigments and an emulsifier. Suitable pigments include, among others, the pigments E170 up to and including E175, e.g. calcium carbonate, titanium dioxide, iron oxides and iron hydroxides, aluminium, silver, gold or a mixture thereof. In addition to these pigments, colorants, for instance E100 to E170, may be dissolved in the solvent in case other colours are wanted.

Preferably, the foundation layer of the hollow figure will be milk chocolate. Naturally, other embodiments on the basis of white chocolate or dark chocolate are also possible.

Preferably, the hollow, chocolate figure depicts an animal, a person or a fantasy figure. A fantasy means includes a character that is not real yet is known to the public at large, such as Santa Claus, Saint Nicolas, Black Pete, the Easter Bunny, or known objects that seem to have been brought to life. In a preferred embodiment, the printing according to the present invention will provide the figure with expression. Expression means that the figure will be given a facial expression such as, glad, funny, happy, etc. in another embodiment the printing provides the figure with additional depth, as a result of which a three-dimensional nature is acquired.

Preferably, the multi-layered, hollow, chocolate figure is manufactured using the method as described above.

According to a third aspect, the present invention also comprises a display provided with several hollow, chocolate figures according to the present invention. They have preferably been individually wrapped in a film.

Other specifics and advantages of the invention will become apparent from the following description of the figures. Said description will only be given by way of example and does not limit the scope of the invention.

Figure 2:
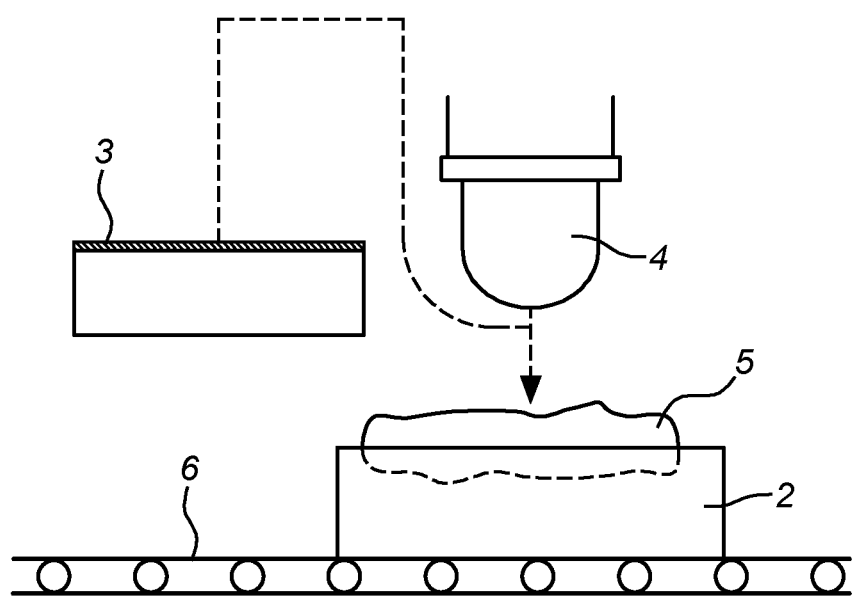
FIG. 2 shows a pad printing system according to an embodiment of the present invention.

FIG. 2 shows a schematic representation of a method according to the invention. Preferably, the printing will take place in an industrial and automated environment.

This method comprises several substeps. In a first step, one or more multi-layered, chocolate hollow figures are cast in a mould (1) consisting of two mould-halves (2, 21) (FIG. 1). In principle, each known mould (1) from the state of the art can be used, consisting of two mould-halves (2, 21) that can be closed and are suitable for manufacturing hollow, chocolate figures (5). The mould shown in FIG. 1 comprises two mould-halves that can be connected by means of a detachable hinge (7) (see 1a up to and including 1c). The foundation layer will be obtained by swirling or rotational moulding (FIG. 1f). Prior to all this a local colouring of the figures may take place (not shown). The figures will have an average wall thickness of between 2 and 5 mm. For that purpose, the required quantity of chocolate per figure produced will be determined in advance.

After casting the hollow figures, said hollow figures will be partially demoulded, thus exposing the half of the hollow figures to be printed on. Demoulding may take place by simply opening both mould-halves (2, 21), in a preferred embodiment, one mould-half of the mould (1) is removed by means of the detachable hinge (7), The partially demoulded hollow figures (5) are subsequently taken to the device for the pad printing, as schematically depicted in FIG. 2. Preferably, transportation takes place via conveyor belts, either with or without the assistance of robots.

The surface to be printed on will describe a curve, optionally provided with additional relief. In the first printing step, a colour preparation is applied to a cliché (3). Said cliché (3), preferably, is a thin metal plate which is provided with a predetermined pattern through etching or lasers. In one embodiment, a quantity of preparation is applied to the cliché in an automated manner. A preparation distribution system, such as a squeegee, will ensure that the colour preparation is evenly distributed over the cliché (not shown).

The cliché (3) may be provided with one or more preparation types. In another embodiment, several clichés may be provided per preparation type and/or applied pattern.

In a second step, a pad (4) will be Instructed to move to the squeegee coated with preparation. In one embodiment, only one pad will be present. In another embodiment, several pads are available, each of which will deal with a part of the printing. The pad (4), preferably, is an elastic silicone pad (4). It will absorb the colour preparation in the predetermined pattern and subsequently migrate to the partially demoulded, hollow figures (5) that are presented via a conveyor belt (6).

In a next step, the pad (4) will migrate downwards, towards the hollow figure (5). In one embodiment, a sensor system will determine the correct position of the pad relative to the hollow figures. In another embodiment, the adjustment will take place manually. The pad (4) will be brought downwards to the surface of the hollow figure using a specific pressure, whereby the colour preparation will be pressed onto the surface. The elastic pad (4) will then partially deform and envelop the surface of the hollow figure (5). The pressure employed, will be in the range of 8 and 12 bar. The exact pressure will depend, among other things, on the specific nature of the printing and the curvature of the surface to be printed on. As the hollow figures (5) are supported by the mould-half (2), it is possible to use a sufficiently high pressure resulting in a fine, uniform printing wherein the risk of breaking is minimised.

After printing, the pad (4) will move away again from the hollow figures (5), after which the pad (4) is able to absorb preparation once more to print on another figure, or after which the pad (4) moves towards cleansing agents in order to be cleaned. Said cleansing agents may include cleansing tape that will absorb the superfluous preparation.

Once all figures in the mould-half have been printed on, said mould-halves will be conveyed onward to the desired units of the production line. This may be a wrapping unit, in which the figures will be fully demoulded and wrapped, for instance in bulk or individually in film.

In one embodiment, the mould will be closed once more, by adding the second empty mould-half, or by simply closing the mould-halves. The mould will subsequently be turned and opened again, after which the unprinted, second half of the figures will be exposed. Subsequently, this unprinted side can also be printed on according to the process as discussed above.

The colour preparation as used for the present invention will preferably comprise a mixture of at least two alcohols, a pigment and an emulsifier. By using an alcohol-based preparation, a preparation having the right viscosity will be obtained that will also dry quickly.

It will be clear that the invention will not be limited to the embodiments discussed above but that many alterations can be introduced without going beyond the scope of this patent application.

CHARACTERISTICS OF THE FIGURES

1: mould
2, 21: mould-halves
3: cliché
4: pad
5: hollow figure
6: conveyor belt
7: detachable hinge

The invention claimed is:

1. A method comprising producing a multi-layered, hollow, chocolate figure by printing thereon a print in an edible colour preparation, comprising the steps of:
    manufacturing said chocolate figure in a mould comprising first and second connected mould-halves,
    wherein the chocolate figure has an average wall thickness of between 2 mm and 5 mm,
    partially demoulding said chocolate figure by removing the first mould half, exposing a first half of the chocolate figure and retaining a remainder of said chocolate figure in the second mould half, with the first half being connected to the remainder of the chocolate figure as the hollow chocolate figure,
    providing one or more types of edible colour preparations on an elastic pad,
    printing the exposed half of said multi-layered, hollow, chocolate figure with the one or more types of edible colour preparations by the elastic pad, wherein
    said printing takes place at a pressure of between 8 and 12 bar and wherein said chocolate figure remains situated in the second mould half during printing, and
    wherein the print applied has a thickness greater than 50 microns and up to 200 microns.

2. Method according to claim 1, wherein the elastic pad has a hardness of between 8 and 12 Shore-A.

3. Method according to claim 1, wherein a cliché provided with a predetermined pattern in relief is used.

4. Method according to claim 1, wherein during the printing, the elastic pad has a speed of between 100 and 200 mm/sec.

5. Method according to claim 1, wherein the used one or more types of edible colour preparations has a viscosity of between 350 and 550 cP.

6. Method according to claim 1, wherein the one or more types of edible colour preparations used comprises an alcohol-based solvent, one or more colour pigments and an emulsifier.

7. Method according to claim 1, wherein the print is applied in one or more passes.

* * * * *

UNITED STATES PATENT AND TRADEMARK OFFICE
CERTIFICATE OF CORRECTION

Page 1 of 1

PATENT NO.         : 10,463,058 B2
APPLICATION NO.    : 15/536162
DATED              : November 5, 2019
INVENTOR(S)        : Luk Patyn It is certified that error appears in the above-identified patent and that said Letters Patent is hereby corrected as shown below:

On the Title Page

Under (71) Applicant: please change "Lokeran" to --Lokeren--.

Signed and Sealed this
Eleventh Day of February, 2020

Andrei Iancu
*Director of the United States Patent and Trademark Office*